(12) United States Patent
Soh

(10) Patent No.: US 7,220,210 B2
(45) Date of Patent: May 22, 2007

(54) MULTIPLE SPEED AUTOMATIC TRANSMISSION FOR A VEHICLE

(75) Inventor: Byeong Ho Soh, Hwaseong (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 169 days.

(21) Appl. No.: 11/158,386

(22) Filed: Jun. 21, 2005

(65) Prior Publication Data

US 2005/0282680 A1  Dec. 22, 2005

(30) Foreign Application Priority Data

Jun. 21, 2004  (KR)  ........................ 10-2004-0046128

(51) Int. Cl.
*F16H 3/62* (2006.01)
(52) U.S. Cl. ............................................. 475/275
(58) Field of Classification Search .............. 475/275, 475/284

See application file for complete search history.

(56) References Cited

U.S. PATENT DOCUMENTS 6,918,852 B2 *  7/2005  Choi ........................... 475/284
7,037,232 B2 *  5/2006  Ishimaru ..................... 475/275

* cited by examiner

*Primary Examiner*—Dirk Wright
(74) *Attorney, Agent, or Firm*—Morgan Lewis & Bockius LLP

(57) ABSTRACT

A multiple speed automatic transmission having eight forward speeds and one reverse speed is realized by combining two simple planetary gear sets and one compound planetary gear set by five clutches and two brakes. Power is delivered efficiently and fuel consumption is enhanced due to the increased number of speeds of the automatic transmission. Step ratios of the eight forward speeds can harmonized so as to gradually decrease from the lower gear to the higher gear, thus shift-feel is be enhanced. Additionally, hill climbing ability in the reverse speed is also enhanced by increasing the speed ratio of the reverse speed.

8 Claims, 3 Drawing Sheets

FIG.2

| | C1 | C2 | C3 | C4 | C5 | B1 | B2 | Speed ratio | Step ratio |
|---|---|---|---|---|---|---|---|---|---|
| 1st gear | | | | ● | ● | ● | | 3.540 | 1.59 |
| 2nd gear | | ● | | | ● | ● | | 2.230 | 1.37 |
| 3rd gear | | | ● | | ● | ● | | 1.630 | 1.31 |
| 4th gear | | ● | ● | | ● | | | 1.240 | 1.24 |
| 5th gear | | | ● | ● | ● | | | 1.000 | 1.23 |
| 6th gear | ● | | ● | | ● | | | 0.815 | 1.16 |
| 7th gear | ● | | | | ● | | | 0.704 | 1.12 |
| 8th gear | ● | ● | | | ● | | | 0.630 | |
| Reverse gear | | ● | | | | ● | ● | −3.556 | |

MULTIPLE SPEED AUTOMATIC TRANSMISSION FOR A VEHICLE

CROSS-REFERENCE TO RELATED APPLICATION

This application claims priority to, and the benefit of, Korean Patent Application 10-2004-0046128 filed in the Korean Intellectual Property Office on Jun. 21, 2004, the entire content of which is incorporated herein by reference.

BACKGROUND OF THE INVENTION (A) Field of the Invention

The present invention relates to a multiple speed automatic transmission for a vehicle. More particularly, the multiple speed automatic transmission includes a gear train that has eight speeds.

(B) Description of the Related Art

A typical multi-stage gearshift mechanism of an automatic transmission includes a plurality of planetary gear sets. Such a plurality of planetary gear sets varies the torque of a powertrain in multi-stages and outputs the torque to an output shaft when receiving a converted engine torque from a torque converter. Power performance and fuel consumption of an engine generally increases with more speeds available in the powertrain. Therefore, it is desirable for powertrains to have as many speeds as possible.

Durability, power transmission efficiency, size, and weight of a transmission are substantially dependent on how the planetary gear sets are arranged, even in transmissions with the same overall number of speeds. Therefore, research to improve the structural strength, reduce power loss, and generate a more compact transmission package is continuously being conducted. Usually, development of a powertrain using planetary gear sets does not devise a wholly new type of planetary gear set. To the contrary, it invokes how single/double pinion planetary gear sets are combined and how clutches, brakes, and one-way clutches are disposed to the combination of planetary gear sets such that required shift speeds and speed ratios are realized with minimal power loss.

With respect to manual transmissions, too many speeds cause a driver the inconvenience of excessive manual shifting. However, for an automatic transmission, a transmission control unit automatically executes shifting by controlling the operation of the powertrain, and therefore, more speeds usually implies more merits. In addition to various developments regarding powertrains, powertrains of automatic transmissions realizing six to eight forward speeds and one reverse speed have recently been introduced.

The above information disclosed in this Background section is only for enhancement of understanding of the background of the invention and therefore, it may contain information that does not form the prior art that is already known in this country to a person or ordinary skill in the art.

SUMMARY OF THE INVENTION

A multiple speed transmission for a vehicle realizes eight forward speeds by combining two simple planetary gear sets and one compound planetary gear set using seven frictional elements. The eight forward speed transmission enhances power delivery efficiency and shift feel resulting from more harmonized step ratios of speed ratios. The transmission also enhances hill climbing ability in the reverse speed by increasing a speed ratio of the reverse speed.

An exemplary multiple speed automatic transmission includes a compound planetary gear set having two single planetary gear sets of first and second planetary gear sets. The transmission also has a third planetary gear set, first to fifth clutches, first and second brakes, and an output member. The first planetary gear set has operating members of a first sun gear, a first ring gear, and a first planet carrier. The second planetary gear set has operational members of a second sun gear, a second ring gear, and a second planet carrier. The compound planetary gear set forms, by direct connection of the second ring gear and the first planet carrier, a first operational element by the first and second sun gears, a second operational element by the second planet carrier, a third operational element by the first planet carrier and the second ring gear, and a fourth operational element by the first ring gear.

The third planetary gear set is a compound planetary gear set that includes a small diameter sun gear, a large diameter sun gear, a third planet carrier commonly used therein, and a third ring gear. The third planetary gear set forms a fifth operational element by the small diameter sun gear, a sixth operational element by the third planet carrier, a seventh operational element by the third ring gear, and an eighth operational element by a large diameter sun gear.

First and second clutches respectively transmit a torque of the fourth operational element to the eighth and fifth operational elements. The third and fourth clutches transmit a torque of an input shaft to the sixth and eighth operational elements, respectively. The fifth clutch transmits a torque of the input shaft to the second operational element. A first brake connects the eighth operational element to the housing of the transmission and the second brake connects the second operational element to the transmission housing. The output member is connected to the seventh operational element.

According to a further embodiment the first forward speed is realized by operation of the first brake and the fourth clutch. The second forward speed is realized by operation of the first brake and the second and fifth clutches. The third forward speed is realized by operation of the first brake and the third clutch. The fourth forward speed is realized by operation of the second and third clutches. The fifth forward speed is realized by operation of the third and fourth clutches. The sixth forward speed is realized by operation of the first, third, and fifth clutches. The seventh forward speed is realized by operation of the first, fourth, and fifth clutches. The eighth forward speed is realized by operation of the first, second, and fifth clutches.

In yet a further embodiment the first sun gear forming the first operational element is directly connected to the transmission housing and acts as a fixed element. The second sun gear is directly connected to the input shaft so as to always act as an input element.

In still a further embodiment the first clutch is connected, at its hub portion, to the first ring gear and at its drum portion is connected to the large diameter sun gear. The second clutch is connected, at its hub portion, to the first ring gear and at its drum portion to the small diameter sun gear. The third clutch is connected, at its drum portion, to the third planet carrier and at its drum portion to the input shaft. The fourth clutch is connected, at its hub portion, to a small diameter sun gear and at its drum portion to the input shaft. The fifth clutch is connected, at its hub portion, to the second planet carrier and at its drum portion to the input shaft. The first brake is connected, at its hub portion, to the large diameter sun gear and the drum portion of the first clutch, and at its drum portion to the transmission housing. The second brake is connected at its hub portion to the second planet carrier, and at its drum portion to the transmission housing.

BRIEF DESCRIPTION OF THE DRAWINGS

FIG. 2 is an operational chart for a gear train according to an embodiment of the present invention.

DETAILED DESCRIPTION OF PREFERRED EMBODIMENTS

Figure 1:
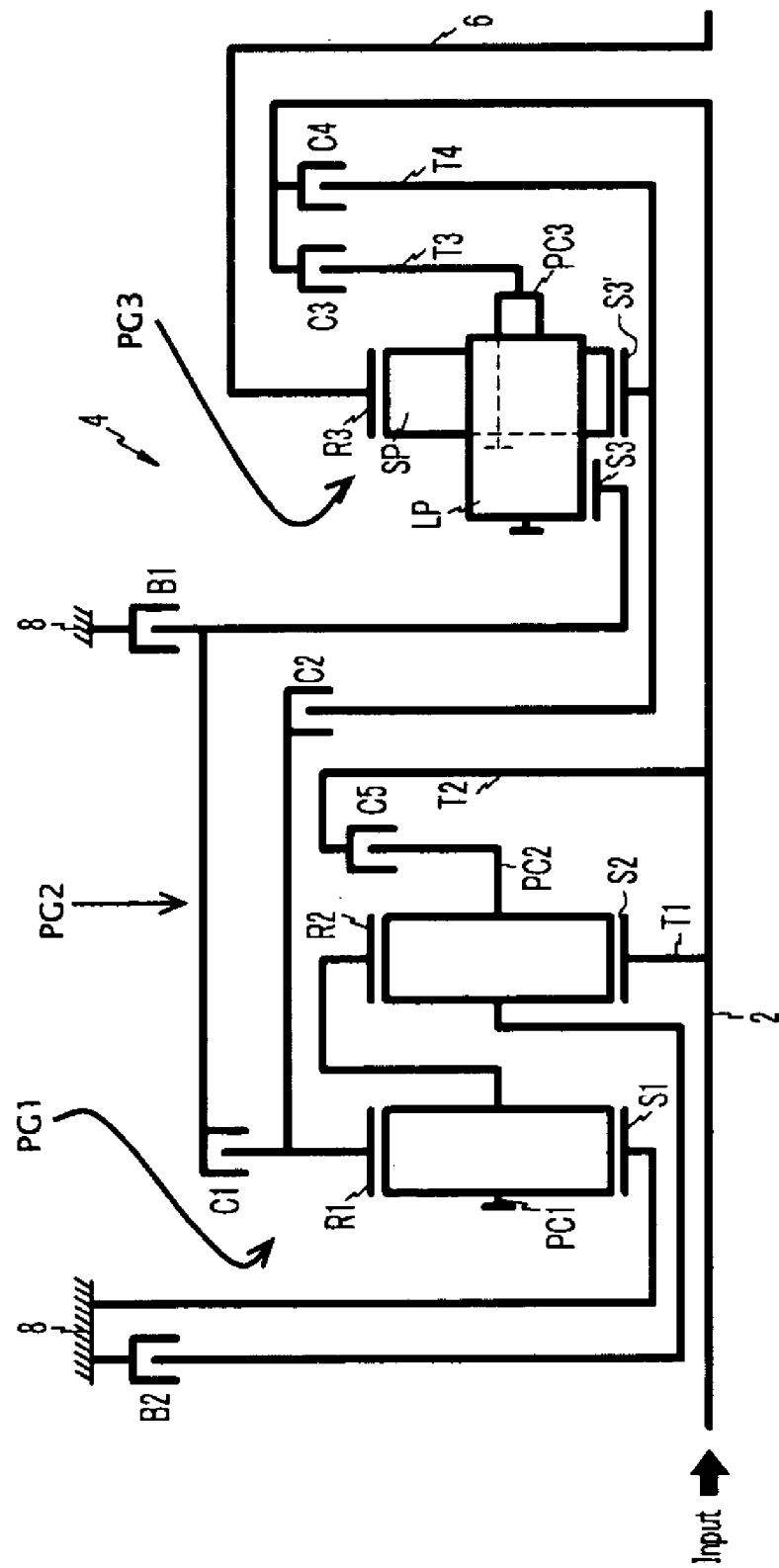
FIG. 1 is a schematic diagram of a gear train of an automatic transmission according to an embodiment of the present invention.
Figure 3:
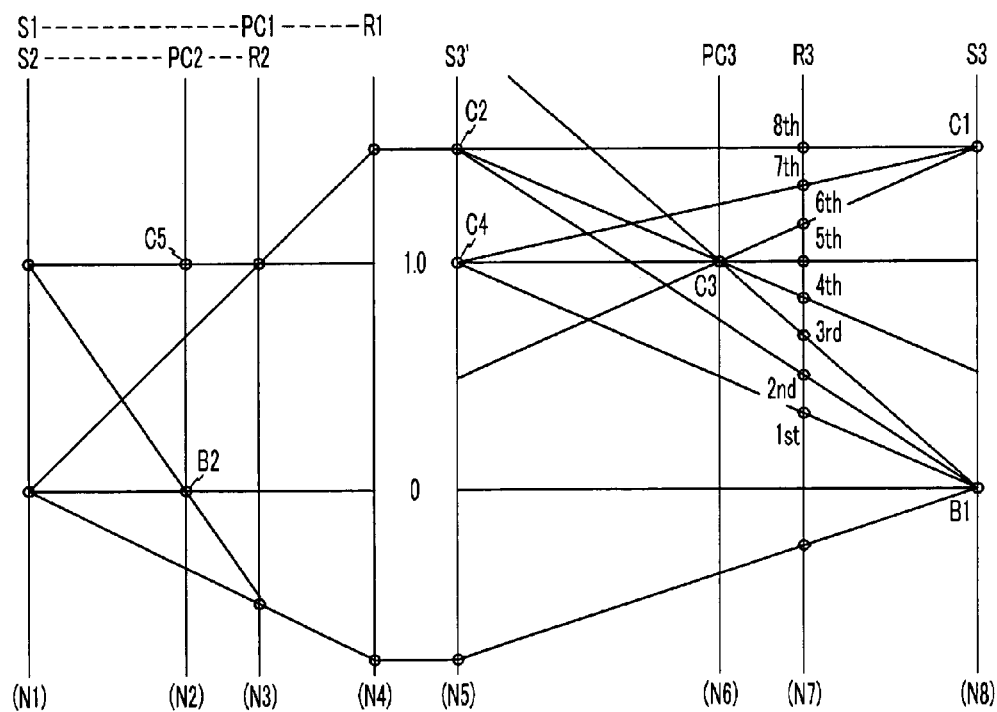
FIG. 3 is a speed diagram of a gear train according to an embodiment of the present invention.

According to the gear train of FIGS. 1–3, an engine torque is applied to an input shaft 2 through a torque converter and a transmission mechanism 4 changes the speed and outputs the changed speed through an output member 6. The transmission mechanism 4 includes first and second planetary gear sets PG1 and PG2 of single pinion planetary gear sets, and a third planetary gear set PG3 of a Ravingneaux type compound planetary gear set. The first, second, and third planetary gear sets are disposed on the input shaft 2. The first planetary gear set PG1 includes operating members of a first sun gear S1, a first ring gear R1, and a first planet carrier PC1. The second planetary gear set PG2 includes operating members of a second sun gear S2, a second ring gear R2, and a second planet carrier PC2. The third planetary gear set PG3 includes operating members of a large diameter sun gear S3, small diameter sun gear S3', a third ring gear R3, and a third planet carrier PC3.

The first and second planetary gear sets PG1 and PG2 form one compound planetary gear set having effectively five operational elements by directly interconnecting the first planet carrier PC1 and the second ring gear R2. In the third ring gear R3 and the third planet carrier PC3 commonly act for the large diameter and small diameter sun gears S3 and S3'.

Regarding the first and second planetary gear sets PG1 and PG2, the first sun gear S1 is fixedly connected to a transmission housing 8, and the second sun gear S2 is fixedly connected to the input shaft 2. In addition, the first ring gear R1 outputting torque is variably connected to the large diameter sun gear S3 interposing a first clutch C1. Similarly, the first ring gear R1 is variably connected to the small diameter sun gear S3' interposing a second clutch C2. The large diameter sun gear S3 is engaged with a long pinion LP of the third planetary gear set PG3, and the small diameter sun gear S3' is engaged with a short pinion SP thereof.

The third planet carrier PC3 and the small diameter sun gear S3 of the third planetary gear set PG3 are variably connected to the input shaft 2 interposing third and fourth clutches C3 and C4, respectively. The second planet carrier PC2 is also variably connected to the input shaft 2 interposing a fifth clutch C5. Accordingly, four input paths T1, T2, T3, and T4 are formed to receive input torque.

The large diameter sun gear S3 and the second planet carrier PC2 are connected to the transmission housing 8 interposing the first and second brakes B1 and B2. Therefore, three fixed elements are formed including the first sun gear S1. According to such a configuration, as shown in FIG. 3, a first operational element N1 of the gear train is formed by the first and second sun gears S1 and S2. A second operational element N2 is formed by the second planet carrier PC2. A third operational element N3 is formed by the first planet carrier PC1 and the second ring gear R2. A fourth operational element N4 is formed by the first ring gear R1. A fifth operational element N5 is formed by small diameter sun gear S3'. A sixth operational element N6 is formed by the third planet carrier PC3. A seventh operational element N7 is formed by the third ring gear R3. And an eighth operational element N8 is formed by large diameter sun gear S3. The formation of the operational elements will be obvious to a person of an ordinary skill in the art, and will not be described in further detail.

Here, each of the first to fifth clutches C1–C5 is realized as a multiplate clutch. The first clutch C1 is connected at its hub portion to the first ring gear R1, and at its drum portion to the large diameter sun gear S3. The second clutch C2 is connected at its drum portion to the first ring gear R1, and at its hub portion to the small diameter sun gear S3'. In addition, the third clutch C3 is connected at its hub portion to the third planet carrier PC3, and at its drum portion to the input shaft 2. The fourth clutch C4 is connected at its hub portion to small diameter sun gear S3', and at its drum portion to the input shaft 2. The fifth clutch C5 is connected at its hub portion to the second planet carrier PC2, and at its drum portion to the input shaft 2.

The first and second brakes B1 and B2 are realized as in the forma of a multiplate clutch. The first brake B1 is connected at its hub portion both to the drum portion of the first clutch C1 and to large diameter sun gear S3, such that the large diameter sun gear S3 may be connected to the transmission housing 8. The second brake B2 is connected at its hub portion to the second planet carrier PC2 such that the second planet carrier PC2 may selectively be connected to the transmission housing 8. Such a structured automatic transmission changes gears under control of an electronic control unit and a hydraulic pressure system in a range selected by a driver.

FIG. 2 illustrates shift-speeds by symbols realized by operations (marked with ● in FIG. 2) and release of the clutches and the brakes. FIG. 3 illustrates shift-speeds realized by an operation of respective clutches and brakes, and a speed diagram showing speed ratios of respective operational elements at each shift-speed.

Hereinafter, an operation of an automatic transmission according to an exemplary embodiment of the present invention will be described in detail with reference to FIG. 1 to FIG. 3.

The first forward speed is realized by an operation of the fourth clutch C4 and the first brake B1. In this case, the torque of the input shaft 4 is inputted to the small diameter sun gear S3' through the fourth input path T4 since the fourth clutch C4 operates. In addition, the large diameter sun gear S3 acts as a reaction element by the operation of the first brake B1, and accordingly, the output element of the third ring gear R3 outputs a maximally reduced speed through an output member 6, realizing an exemplary speed ratio of about 3.540.

The second forward speed is realized by an operation of the second clutch C2, the fifth clutch C5, and the first brake B1. Accordingly, torque is input through both of the first and second input paths T1 and T2. Therefore, the second planetary gear set PG2 rotate as a whole and outputs the input speed to the first planet carrier PC1 of the first planetary gear set PG1. Consequently, since the first sun gear S1 acts as a reaction element, an increased speed is output from the first ring gear R1.

Then, the output of the first ring gear R1 is input to the small diameter sun gear S3' because of the operation of the second clutch C2. Because the large diameter sun gear S3 acts as a reaction element by the operation of the first brake B1, shifting to the second forward speed is realized because a reduced speed, less reduced than in the first speed, is output, realizing an exemplary speed ratio of about 2.230.

The third forward speed is realized by an operation of the third clutch C3 and the first brake B1. In this case, the first and second planetary gear sets PG1 and PG2 does not actually act for the shift-speed. The torque of the input shaft 2 is input through the third input path T3 by the operation of the third clutch C3, and the large diameter sun gear S3 acts as a reaction element by the operation of the first brake B1. Therefore, the output element of the third ring gear R3 outputs a reduced speed through the output member 6, realizing an exemplary speed ratio of about 1.630.

The fourth forward speed is realized by a simultaneous operation of the second, third, and fifth clutches C2, C3, and C5. In this case, the first and second planetary gear sets PG1 and PG2 operate the same as in the second forward speed, and outputs an increased speed to the small diameter sun gear S3' of the third planetary gear set PG3. The third planetary gear set PG3 operates similarly as in the third forward speed reducing the rotation speed, and outputs a reduced speed less reduced than in the third forward speed, realizing an exemplary speed ratio of about 1.240.

The fifth forward speed is realized by a simultaneous operation of the third clutch C3 and the fourth clutch C4. In this case, the first and second planetary gear sets PG1 and PG2 does not actually act for the shift-speed. The third planetary gear set PG3 rotates as a whole by operation of the third and fourth clutches C3 and C4, and outputs the input speed, realizing an exemplary speed ratio of about 1.000.

The sixth forward speed is realized by an operation of the first clutch C1, the third clutch C3, and the fifth clutch C5. In this case, an increased speed is output from the first and second planetary gear sets PG1 and PG2 as in the fourth forward speed, and such an increased speed is input to the large diameter sun gear S3 through the first clutch C1. The third planet carrier PC3 receives the input speed through the third input path T3 by the operation of the third clutch C3. Therefore the output speed is formed between the speeds of the large diameter sun gear S3 and the third planet carrier PC3, realizing an overdrive output of an exemplary speed ratio of about 0.815.

The seventh forward speed is realized by an operation of the first, fourth, and fifth clutches C1, C4, and C5. In this case, an increased speed is output from the first and second planetary gear sets PG1 and PG2 as in the sixth forward speed, and such an increased speed is input to the large diameter sun gear S3 through the first clutch C1. The third planet carrier PC3 receives the input speed through the third input path T3 by the operation of the third clutch C3. Therefore the output speed is formed between the speeds of the large diameter sun gear S3 and the small diameter sun gear S3', realizing an overdrive output of an exemplary speed ratio of about 0.704.

The eighth forward speed is realized by an operation of the first, second, and fifth clutches C1, C2, and C5. In this case, an increased speed is output from the first and second planetary gear sets PG1 and PG2 as in the seventh forward speed, and such an increased speed is simultaneously input to the large diameter sun gear S3 and the small diameter sun gear S3' through the first and second clutches C1 and C2. Therefore, the third planetary gear set PG3 rotates as a whole, realizing a highest shift-speed of an exemplary speed ratio of about 0.630.

The reverse speed is realized by an operation of the second clutch C2 and the first and second brakes B1 and B2. In this case, the torque input through the first input path T1 is output through the output element of the first ring gear R1 as a reversed output by the operation of the second brake B1. The reversed output is input to the small diameter sun gear S3' by the operation of the second clutch C2. According to such a reversed input state, the large diameter sun gear S1 acts as a reaction element by operation of the first brake B1. Therefore, the output element of the third ring gear R3 outputs a reversed speed, realizing a shifting to the reverse speed of an exemplary speed ratio of about ×3.556.

The symbol "(●)" shown in FIG. 2 implies that an operation of the fifth clutch C5 does not cause any problem.

As described above, according to an automatic transmission of an exemplary embodiment of the present invention, eight forward speeds and one reverse speed are realized by combining two simple planetary gear sets and one compound planetary gear set by five clutches and two brakes. Therefore, power is delivered efficiently and fuel consumption may be enhanced due to an increased number of speeds of an automatic transmission. In addition, the step ratios of the eight forward speeds may be harmonized so as to gradually decrease from the lower gear to the higher gear, thus shift-feel may be enhanced. In addition, hill climbing ability in the reverse speed is also enhanced by increasing a speed ratio of the reverse speed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A multiple speed automatic transmission for a vehicle, comprising:

a compound planetary gear set including two single planetary gear sets of a first planetary gear set having operating members of a first sun gear, a first ring gear, and a first planet carrier, and a second planetary gear set having operational members of a second sun gear, a second ring gear, and a second planet carrier, wherein the compound planetary gear set forms, by directly connecting the second ring gear and the first planet carrier, a first operational element by the first and second sun gears, a second operational element by the second planet carrier, a third operational element by the first planet carrier and the second ring gear, and a fourth operational element by the first ring gear;

a third planetary gear set of a compound planetary gear set having operating members of a small diameter sun gear, a large diameter sun gear, a third planet carrier commonly used therein, and a third ring gear commonly used therein, wherein the third planetary gear set forms a fifth operational element by the small diameter sun gear, a sixth operational element by the third planet carrier, a seventh operational element by the third ring gear, and an eighth operational element by large diameter sun gear;

first and second clutches respectively transmitting a torque of the fourth operational element to the eighth operational element and the fifth operational element;

third and fourth clutches respectively transmitting a torque of an input shaft to the sixth and eighth operational elements;
a fifth clutch transmitting a torque of the input shaft to the second operational element;
a first brake connecting the eighth operational element to a transmission housing;
a second brake connecting the second operational element to the transmission housing; and
an output member connected to the seventh operational element.

2. The multiple speed automatic transmission of claim 1, wherein:
the first forward speed is realized by an operation of the first brake and the fourth clutch;
the second forward speed is realized by an operation of the first brake and the second and fifth clutches;
the third forward speed is realized by an operation of the first brake and the third clutch;
the fourth forward speed is realized by an operation of the second and third clutches;
the fifth forward speed is realized by an operation of the third and fourth clutches;
the sixth forward speed is realized by an operation of the first, third, and fifth clutches;
the seventh forward speed is realized by an operation of the first, fourth, and fifth clutches; and
the eighth forward speed is realized by an operation of the first, second, and fifth clutches.

3. The multiple speed automatic transmission of claim 1, wherein:
the first sun gear forming the first operational element is directly connected to the transmission housing and acts as a fixed element; and
the second sun gear is directly connected to the input shaft so as to always act as an input element.

4. The multiple speed automatic transmission of claim 2, wherein:
the first sun gear forming the first operational element is directly connected to the transmission housing and acts as a fixed element; and
the second sun gear is directly connected to the input shaft so as to always act as an input element.

5. The multiple speed automatic transmission of claim 1, wherein:
the first clutch is connected at its hub portion to the first ring gear, and at its drum portion to the large diameter sun gear;
the second clutch is connected at its hub portion to the first ring gear, and at its drum portion to the small diameter sun gear;
the third clutch is connected at its drum portion to the third planet carrier, and at its drum portion to the input shaft;
the fourth clutch is connected at its hub .portion to small diameter sun gear, and at its drum portion to the input shaft;
the fifth clutch is connected at its hub portion to the second planet carrier, and at its drum portion to the input shaft;
the first brake is connected at its hub portion to the large diameter sun gear and the drum portion of the first clutch, and at its drum portion to the transmission housing; and
the second brake is connected at its hub portion to the second planet carrier, and at its drum portion to the transmission housing.

6. The multiple speed automatic transmission of claim 2, wherein:
the first clutch is connected at its hub portion to the first ring gear, and at its drum portion to the large diameter sun gear;
the second clutch is connected at its hub portion to the first ring gear, and at its drum portion to the small diameter sun gear;
the third clutch is connected at its drum portion to the third planet carrier, and at its drum portion to the input shaft;
the fourth clutch is connected at its hub portion to small diameter sun gear, and at its drum portion to the input shaft;
the fifth clutch is connected at its hub portion to the second planet carrier, and at its drum portion to the input shaft;
the first brake is connected at its hub portion to the large diameter sun gear and the drum portion of the first clutch, and at its drum portion to the transmission housing; and
the second brake is connected at its hub portion to the second planet carrier, and at its drum portion to the transmission housing.

7. The multiple speed automatic transmission of claim 3, wherein:
the first clutch is connected at its hub portion to the first ring gear, and at its drum portion to the large diameter sun gear;
the second clutch is connected at its hub portion to the first ring gear, and at its drum portion to the small diameter sun gear;
the third clutch is connected at its drum portion to the third planet carrier, and at its drum portion to the input shaft;
the fourth clutch is connected at its hub portion to small diameter sun gear, and at its drum portion to the input shaft;
the fifth clutch is connected at its hub portion to the second planet carrier, and at its drum portion to the input shaft;
the first brake is connected at its hub portion to the large diameter sun gear and the drum portion of the first clutch, and at its drum portion to the transmission housing; and
the second brake is connected at its hub portion to the second planet carrier, and at its drum portion to the transmission housing.

8. The multiple speed automatic transmission of claim 4, wherein:
the first clutch is connected at its hub portion to the first ring gear, and at its drum portion to the large diameter sun gear;
the second clutch is connected at its hub portion to the first ring gear, and at its drum portion to the small diameter sun gear;
the third clutch is connected at its drum portion to the third planet carrier, and at its drum portion to the input shaft;

the fourth clutch is connected at its hub portion to small diameter sun gear, and at its drum portion to the input shaft;

the fifth clutch is connected at its hub portion to the second planet carrier, and at its drum portion to the input shaft;

the first brake is connected at its hub portion to the large diameter sun gear and the drum portion of the first clutch, and at its drum portion to the transmission housing; and the second brake is connected at its hub portion to the second planet carrier, and at its drum portion to the transmission housing.

* * * * *